(12) United States Patent
Yang et al.

(10) Patent No.: US 9,170,379 B2
(45) Date of Patent: Oct. 27, 2015

(54) OPTICAL FIBER CONNECTOR AND ASSEMBLY METHOD THEREFOR

(75) Inventors: Guo Yang, Guandong (CN); Qiyue Wang, Guandong (CN)

(73) Assignee: SUNSEA TELECOMMUNICATIONS CO., LTD., Shenzhen, Guangdong (CN)

( * ) Notice: Subject to any disclaimer, the term of this patent is extended or adjusted under 35 U.S.C. 154(b) by 158 days.

(21) Appl. No.: 14/119,595

(22) PCT Filed: Feb. 17, 2012

(86) PCT No.: PCT/CN2012/071272
§ 371 (c)(1),
(2), (4) Date: Nov. 22, 2013

(87) PCT Pub. No.: WO2013/104136
PCT Pub. Date: Jul. 18, 2013

(65) Prior Publication Data
US 2014/0105542 A1    Apr. 17, 2014

(30) Foreign Application Priority Data
Jan. 11, 2012   (CN) .......................... 2012 1 0008583

(51) Int. Cl.
*G02B 6/38*   (2006.01)
*G02B 6/42*   (2006.01)

(52) U.S. Cl.
CPC ................ *G02B 6/381* (2013.01); *G02B 6/387* (2013.01); *G02B 6/3831* (2013.01);
(Continued)

(58) Field of Classification Search
CPC combination set(s) only.
See application file for complete search history.

(56) References Cited

U.S. PATENT DOCUMENTS 6,464,402 B1   10/2002   Andrews et al.
2002/0186932 A1   12/2002   Barnes et al.
(Continued)

FOREIGN PATENT DOCUMENTS

CN   1121180   4/1996
CN   200947127   9/2007
(Continued)

OTHER PUBLICATIONS
Partial Supplementary European Search Report mailed Apr. 29, 2015 in European Application No. 12865259.1 (7 pages).
(Continued)

*Primary Examiner* — Ryan Lepisto
*Assistant Examiner* — Erin Chiem
(74) *Attorney, Agent, or Firm* — Nixon & Vanderhye P.C.

(57) ABSTRACT

Disclosed are an optical fiber connector an assembly method therefor. The connector is used for matching with an optical fiber adapter, and comprises a connector casing, a ceramic ferrule (2), a spring (4) and a boot (8), wherein the connector casing has a lateral width of 2.5 mm to 4.5 mm, is formed by inserting and locking a front casing (1) and a rear casing (5) and forms a cavity; the tail of the connector casing is connected to the boot (8), the external front end of the connector casing contains a guiding block (101) and a combined elastic arm successively in the rearward direction, and a retaining convex block (104) is arranged on the combined elastic arm; the tail end of the ceramic ferrule (2) is fixed to a tailstock (3) of the ceramic ferrule and penetrates through a through hole at the front end of the connector casing; and the spring is compressed between the tailstock (3) of the ceramic ferrule and a stop block (501) formed by the inner walls of the connector casing. The connector greatly reduces the overall dimensions of the connector, and increase the installation density of the connector.

17 Claims, 5 Drawing Sheets

(52) U.S. Cl.
CPC ............ *G02B 6/3854* (2013.01); *G02B 6/3861* (2013.01); *G02B 6/3887* (2013.01); *G02B 6/3893* (2013.01); *G02B 6/4292* (2013.01); *Y10T 29/49815* (2015.01)

(56) References Cited

U.S. PATENT DOCUMENTS

| | | | |
|---|---|---|---|
| 2004/0047565 | A1 | 3/2004 | Cheng et al. |
| 2004/0072454 | A1 | 4/2004 | Nakajima et al. |
| 2009/0297159 | A1 | 12/2009 | Margolin et al. |
| 2011/0097044 | A1 | 4/2011 | Saito et al. |

FOREIGN PATENT DOCUMENTS

| | | |
|---|---|---|
| CN | 201413419 | 2/2010 |
| CN | 201464673 | 5/2010 |
| CN | 101881865 | 11/2010 |
| EP | 2 241 913 A1 | 10/2010 |
| JP | 54-49709 A | 4/1979 |
| JP | 63-256907 A | 10/1988 |
| JP | 9-127370 A | 5/1997 |
| JP | 2000-235132 A | 8/2000 |
| JP | 2008-122506 A | 5/2008 |
| JP | 2011-8209 A | 1/2011 |
| JP | 2011-118348 A | 6/2011 |
| JP | 2011-253166 A | 12/2011 |
| WO | WO 2010/125788 A1 | 11/2010 |
| WO | WO 2011/116164 A1 | 9/2011 |
| WO | WO 2011/116166 A1 | 9/2011 |

OTHER PUBLICATIONS

International Search Report for PCT/CN2012/071272, mailed Oct. 25, 2012.

OPTICAL FIBER CONNECTOR AND ASSEMBLY METHOD THEREFOR

This application is the U.S. national phase of International Application No. PCT/CN2012/071272, filed 17 Feb. 2012, which designated the U.S. and claims priority to CN Application No. 201210008583.3, filed 17 Feb. 2012, the entire contents of each of which are hereby incorporated by reference.

TECHNICAL FIELD

The present invention relates to an optical fiber connecting device, in particular, to an optical fiber connector suitable for a higher installation density and an assembly method therefor.

TECHNICAL BACKGROUND

Optical fiber communication, which has been one of the mainstays in modern communication, is essential to the modern telecommunication network. Optical fibers, as transmission media for high-speed broadband digital communication, are used increasingly widely along with the development of the network science and technology. An optical fiber connector is a device serving for a detachable (removable) connection between optical fibers, so as to precisely abut an end face of an optical fiber on an end face of another optical fiber, so that the light energy outputted from a transmitting optical fiber can be maximally coupled to a receiving optical fiber and an impact on the system caused by the intervention of the optical fiber connector into the optical link can be minimized. Currently, a common optical fiber connector may be of, for example, a Ferrule Connector (FC), Subscriber Connector (SC), Straight Tip (ST), Lucent Connector (LC), D4, DIN, Miniature unit Coupling (MU) or Mechanical Transfer (MT) type, depending on the structure of its connecting head.

The type-FC optical fiber connector, which was first developed by NTT from Japan, is externally strengthened by a metal sleeve and fastened by a turnbuckle.

The type-SC optical fiber connector has a cuboid casing, and inserting pins and a coupling sleeve with the identical structures and dimensions as the type-FC optical fiber connector, and may be fastened by a bolt.

The type-ST optical fiber connector is different from the type-SC optical fiber connector in that a core of the ST connector is exposed while the core of the SC connector is within the connecting head.

The type-LC optical fiber connector, which was researched and developed by famous Bell Labs, is made with a modular Registered Jack (RJ) latch mechanism which is easy for operations. The dimension of the inserting pins and the sleeve of the type-LC optical fiber connector is 1.25 mm, i.e. half of that of the common type-SC or type-FC optical fiber connector and so on, and the dimension of the corresponding interface end face of the type-LC optical fiber connector is 4.5 mm×4.5 mm, thereby increasing the density of the optical fiber connectors in an optical fiber distributing frame. Currently, the type-LC connector has become dominant in terms of single-mode Small Form Factor (SFF) and its multi-mode applications are rapidly increased.

The Miniature Unit Coupling (MU) connector is so far the minimum single-core optical fiber connector developed by NTT based on the most used type-SC connector, and employs an aluminium pipe with a diameter of 1.25 mm and a self-holding mechanism. The MU connector is advantageous for its suitability for high-density installation, but has an interface end face with a dimension up to 6.5 mm×4.5 mm.

With the large-scale promotion of Fiber To The Home (FTTH), the optical fiber network is developed with the broader bandwidth and the larger capacity, and more and more optical fibers need to be connected in an optical access network. Correspondingly, the transition capacity demand for hardware equipment is also growing, the installation density of the optical fiber connectors needs to be improved, and the volume of the optical fiber connector needs to be decreased, especially the lateral dimension of the interface end face of the optical fiber connector is required to be reduced as much as possible, so as to increase the installation density of the optical fiber connectors without any change to the physical volume of the existing equipment. However, the structure and the assembly process of the above existing optical fiber connectors do not meet such demands.

SUMMARY OF THE INVENTION

An object of the present invention is to provide an optical fiber connector, which is different with the structure of the existing optical fiber connector, and may greatly reduce the lateral dimension of an interface end face of the optical fiber connector and increase an installation density of the optical fiber connector under meeting the structure strength, and an assembly method therefor.

To achieve the objects of the present invention, the following solutions can be used.

An optical fiber connector for matching with an optical fiber adapter includes a connector casing, a ceramic ferrule 2, a spring 4 and a boot 8. The connector casing has a lateral width of 2.5 mm to 4.5 mm and is formed by a front casing 1 and a rear casing 5 locked together, a cavity is formed within the connector casing. A tail portion of the connector casing is connected to the boot 8. A guiding block 101 for preventing inversed insertion and a combined elastic arm are successively arranged on the external side of the connector casing from the front end to the rear end of the connector casing, and a retaining convex block 104 is arranged on the combined elastic arm. A tail end of the ceramic ferrule 2 is fixed to a ceramic ferrule tailstock 3, and the ceramic ferrule 2 projects out from a through hole 106 at the front end of the connector, and the spring 4 is compressed between a stop block 501 formed by the inner wall of the connector casing and the ceramic ferrule tailstock 3.

Particularly, an inserting block 105 is arranged at the bottom of the connector casing and can be inserted into a corresponding groove at the optical fiber adapter, to prevent the shake of the optical fiber connector in the vertical direction.

Particularly, the cross section of an inserting portion of the rear casing 5 has an inverted-U shape, front casing hook tabs 502 are provided on both external lateral sides of the inserting portion. Correspondingly, the front casing 1 contains engagement recesses 107 at its both lateral walls, so that the front casing hook tabs 502 and the engagement recesses 107 are locked with each other when the rear casing 5 is inserted into the front casing 1.

Particularly, the combined elastic arm includes two elastic cantilevers arranged opposite to each other, including a first elastic cantilever 102 and a second elastic cantilever 103. An end of the first elastic cantilever 102 is provided with a retaining convex block 104 with a slope, and clamp hook tabs 504 are provided at its lateral faces of the second elastic cantilever 103 and used along with a clamp 14 for combining integrally a plurality of the second elastic cantilevers 103

Particularly, a positioning block 108 and a positioning slot 503 matching with each other are arranged at the bottoms of the front casing 1 and the rear casing 5, respectively.

Particularly, the front end of the connector casing contains surrounding protectors 110 corresponding to the projecting portion of the ceramic ferrule 2, and the surface of the surrounding protector 110 that face each other are arc-shaped.

Particularly, the cavity has a small front portion and a large rear portion. The front portion of the cavity constrains the spring 4 circumferentially, and the rear portion of the cavity is used to accommodate the bending deformation of the optical fiber caused by the retreatment of the ceramic ferrule 2.

Particularly, a tail portion of the rear casing 5 is fixedly connected with a tail pipe 6 in communication with the cavity. The tail pipe 6 is provided with a circumferential groove 601 and extended through a metal pipe 7 which is deformable when pressed.

Particularly, the boot 8 is fixedly connected to the connector casing by the tail pipe 6 and an anti-spin insert 12.

Preferably, the connector casing has a lateral width of 2.5 mm to 4.5 mm.

Further, a through hole 109 is arranged at the connector casing, and is used for receiving a connecting rod for combining integrally a plurality of the optical fiber connectors.

Further, a through slot 505 is arranged at the connector casing, and is used for receiving a connecting sheet for combining integrally a plurality of the optical fiber connectors.

Preferably, the connecting rod is a joint pin 15, which is in an interference fit with the through hole 109.

Preferably, the connecting sheet is a combined anti-spin insert 16, which is used for connecting simultaneously a plurality of the connector casings and the boots 8.

Preferably, the connecting sheet is a combined connecting plate 17, which is used for connecting simultaneously a plurality of the connector casings.

Meanwhile, an assembly method of a single-core optical fiber connector is provided and includes the following steps 1-7:

1. a tail end of a ceramic ferrule 2 is inserted into and fixed to a ceramic ferrule tailstock 3;

2. an optical fiber jacket 11 of a connecting end of an optical fiber is removed, an optical fiber tight buffer 10 of a suitable length and an aramid yarn layer 13 of a suitable length are remained, and an optical fiber core 9 of a suitable length is exposed;

3. the connecting end is inserted into the boot 8, the metal pipe 7, the tail pipe 6, the rear casing 5 and the spring 4 successively, and then the optical fiber core 9 is cleaned to remove a coating layer and inserted into the hole of the ceramic ferrule 2 through the ceramic ferrule tailstock 3;

4. an adhesive placed into the ceramic ferrule tailstock 3 beforehand is heated and solidified so that the optical fiber is fixedly connected with the ceramic ferrule tailstock 3;

5. after the adhesive is solidified, the ceramic ferrule 2 along with the ceramic ferrule tailstock 3 are placed into the front casing 1 so that the ceramic ferrule 2 projects from the through hole 106 at the front end of the front casing 1, then the spring 4 is placed within the front casing 1, and the rear casing 5 is inserted into the front casing 1 for locking;

6. the tail pipe 6 is covered by the aramid yarn layer 13, and then the metal pipe 7 is placed around the aramid yarn layer 13 and pressed and deformed to form a fixed connection; and 7. an anti-spin insert 12 is assembled in the rear casing 5, and the anti-spin insert 12 and the metal pipe 7 are inserted into the boot 8 to complete the assembly of the connector.

Further, in the step 7, the optical fiber jacket 11 may be fixedly adhered to the boot 8.

Further, accordingly in assembling, the connecting end is inserted into a heat-shrinkable sleeve and then into the metal pipe 7 in the step 3, and then the heat-shrinkable sleeve is placed around the external faces of the metal pipe 7 and the optical fiber jacket 11 and then heated and fixed after the step 6, to further enhance the connecting strength of the optical fiber.

Meanwhile an assembly method of a multiple-core optical fiber connector also is provided and includes the following steps 1-3:

1. a plurality of assembled single-core optical fiber connectors are arranged closely in parallel, and a connecting rod is inserted through a through hole 109 of each connector successively;

2. a connecting sheet is inserted into through slots 505 of each connector; and 3. a clamp 14 clamps onto clamp hook tabs 504 of the single-core optical fiber connectors at the lateral sides of the multiple-core optical fiber connector to combine integrally a plurality of second elastic cantilevers 103.

Under meeting the structure strength and use function, the optical fiber connector according to the present invention greatly reduces its overall dimensions, the lateral width of its interface end face may be as small as 2.5 mm to 4.5 mm, thereby greatly increasing the installation density of the optical fiber connector.

DESCRIPTION OF DRAWINGS

The present invention will be further described in detail below with reference to the accompanying drawings and embodiments.

| A list of the reference numerals: | | |
|---|---|---|
| 1: Front Casing; | 2: Ceramic Ferrule; | 3: Ceramic Ferrule Tailstock; |
| 4: Spring; | 5: Rear Casing; | 6: Tail Pipe; |
| 7: Metal Pipe; | 8: Boot; | 9: Optical Fiber Core; |
| 10: Tight buffer; | 11: Optical Fiber Jacket; | 12: Anti-Spin Insert; |
| 13: Aramid Yarn Layer; | 14: Clamp; | 15: Joint pin; |
| 16: Combined Anti-Spin Insert; | | |
| 17: Combined Connecting Plate; | | |
| 101: Guiding Block; | 102: First Elastic Cantilever; | |
| 103: Second Elastic Cantilever; | 104: Retaining Convex Block; | |
| 105: Inserting Block; | 106: Through Hole; | 107: Engagement Recess; |
| 108: Positioning Block; | 109: Through Hole; | 110: Surrounding Protector; |
| 501: Stop Block; | 502: Front Casing Hook Tab; | 503: Positioning Slot; |
| 504: Clamp Hook Tab; | 505: Through Slot; | 506: Positioning Block; |
| 161: Notch; | 162: Retaining Protrusion; | |
| 141: Base Plate; | 142: Lug; | 143: Engagement Recess. |

DETAILED DESCRIPTION OF THE PREFERRED EMBODIMENT

As shown in FIGS. 1 to 8, a specific embodiment of an optical fiber connector according to the present invention is given. The connector includes a connector casing formed by a front casing 1 and a rear casing 5 locked together. The cross section of an inserting portion of the rear casing 5 has an inverted-U shape, and front casing hook tabs 502 are provided on both external lateral sides of the inverted-U shaped structure (i.e. the inserting portion with the cross section of the inverted-U shape). Correspondingly, the front casing 1 contains engagement recesses 107 on its both lateral walls, respectively. When the rear casing 5 is inserted into the front casing 1, the front casing hook tabs 502 may pop into the engagement recesses 107 for the purpose of locking. The inverted-U shaped structure enables the front casing hook tabs 502 on both external lateral sides to be pressed towards each other during the inserting on one hand, and provides an elastic force to enable the front casing hook tabs 502 to pop into the engagement recesses 107 when reaching the engagement recesses 107 for the purpose of locking on the other hand. A through hole 106 is arranged at the front end of the front casing 1. A cavity is formed within the front casing 1 and the rear casing 5 which are locked together, and the front portion of the cavity is small while the rear portion of the cavity is large. The front portion of the cavity is used to accommodate a ceramic ferrule 2, a ceramic ferrule tailstock 3 and a spring 4, and constrain the spring 4 circumferentially. The tail end of the ceramic ferrule 2 is fixed to the ceramic ferrule tailstock 3 and the ceramic ferrule 2 penetrates through the through hole 106 at the front end of the connector casing. The spring 4 is compressed between the ceramic ferrule tailstock 3 and the front end face of the inverted-U shaped structure of the rear casing 5. The front end face of the inverted-U shaped structure serves as a stop block 501, and the ceramic ferrule 2 and the ceramic ferrule tailstock 3 are movable. When optical fiber connecting heads are inserted into the front and rear ends of an adapter, respectively, a corresponding elastic force is applied onto each ceramic ferrule 2 by the spring 4 after the ceramic ferrules 2 abut on each other within the adapter. The large rear portion of the cavity is used to accommodate the bending deformation of the optical fiber within the cavity caused by the retreatment of the ceramic ferrule 2, which avoids effectively a break or damage of the optical fiber caused by the bend of the optical fiber which is too much to be accommodated by the cavity during the retreatment of the ceramic ferrule 2 when the connector is inserted into the adapter.

An inserting block 105, which is arranged at the bottom of the connector casing, may be inserted into a corresponding groove arranged at the adapter, for the purpose of preventing the shake of the optical fiber connector in the vertical direction.

With the reduced thickness of the connector casing, a positioning block 108 and a positioning slot 503 matching with each other are respectively arranged at the bottoms of the front casing 1 and the rear casing 5 in order to enhance the strength of the locking between the front casing and the rear casing, so that a tenon structure is formed after the locking to enhance the strength of the connection between the front casing 1 and the rear casing 5.

To protect the portion of the ceramic ferrule 2 that projects from the connector casing, the front end of the connector casing contains surrounding protectors 110 corresponding to the projecting portion of the ceramic ferrule 2. The surfaces of the surrounding protectors 110 that face each other are arc-shaped so that both lateral sides of each surrounding protector 110 have a relatively large thickness, thereby ensuring enough strength of the connection between the surrounding protector 110 and the front casing 1.

A guiding block 101 and a combined elastic arm are successively arranged on the external side of the connector casing from the front end to the rear end of the connector casing. The guiding block 101 plays a guiding function when the connector is inserted into the adapter on one hand, and plays a function of preventing inverse insertion on the other hand, so as to ensure the correct insertion of the optical fiber connector. The combined elastic arm includes two elastic cantilevers arranged opposite to each other, including a first elastic cantilever 102 and a second elastic cantilever 103. A fixed end of the first elastic cantilever 102 is arranged on the front casing 1, and a free end of the first elastic cantilever 102 includes a retaining convex block 104 with a slope. The retaining convex block 104 is used to pop into a corresponding groove of the adapter to form the locking under the effect of the elasticity of the first elastic cantilever 102 itself when the optical fiber connector is inserted into a predesigned position of the adapter. When being removed, the first elastic cantilever 102 is pressed down so that the retaining convex block 104 is moved out from the groove of the adapter, and then the first elastic cantilever 102 is automatically removed from the slot of the adapter under the effect of the elasticity of the first elastic cantilever 102 and the slope. A fixed end of the second elastic cantilever 103 is arranged on the rear casing 5, and a free end of the second elastic cantilever 103 is adapted to be placed on the free end of the first elastic cantilever 102, so that the first elastic cantilever 102 is pressed down by pressing on the second elastic cantilever 103. The second elastic cantilever 103 contains clamp hook tabs 504 at its lateral faces. The second elastic cantilevers 103 of multiple optical fiber connectors to be used in parallel may be integrally combined using a clamp 14, as shown by a double optical fiber connector shown in FIGS. 9 to 12. Preferably, the clamp 14 is formed by a stamped elastic metal sheet. The clamp 14 includes a base plate 141 made of the elastic material and two lugs 142 formed two bent ends of the base plate 141. Engagement recesses 143 matching with the clamp hook tabs 504 are arranged at the lugs 142. The elastic arms of two or more optical fiber connectors may be moved simultaneously after the clamp hook tabs 504 are engaged in the engagement recesses 143, for the sake of easy operation.

The tail portion of the rear casing 5 is fixedly connected with a tail pipe 6 in communication with the cavity. The tail pipe 6 is typically made of metal and is formed integrally with the rear casing 5 by an injection molding process. A circumferential groove 601 is formed around the tail pipe 6, and the tail pipe 6 is extended through a metal pipe 7 which is deformable when pressed. In assembling, the aramid yarn layer 13 of the optical fiber is arranged between the tail pipe 6 and the metal pipe 7, and the metal pipe 7 is pressed with a tool and deformed at the circumferential groove 601, thereby the optical fiber is fixedly connected to the connector.

A boot 8 is arranged at the tail portion of the connector casing for protecting the optical fiber, and is fixedly connected with the connector casing by the tail pipe 6 and an anti-spin insert 12. One end of the anti-spin insert 12 is inserted into the connector casing while the other end thereof is inserted into the corresponding hole in the boot 8, to prevent the boot 8 from rotating around the tail pipe 6 and enhance the strength of the connection between the boot 8 and the connector casing.

For the sake of fixedly connecting a plurality of the optical fiber connectors to form a multiple combined optical fiber connector, a through hole 109, a through slot 505 or a combination thereof is arranged at the connector casing and the plurality of the optical fiber connectors may be combined integrally by a connecting rod or a connecting sheet. In the double optical fiber connector shown in FIGS. 9 to 12 as a preferable solution, two optical fiber connectors are fixedly connected by a combination of a joint pin 15 and a combined anti-spin insert 16. The joint pin 15 is in an interference fit with the through holes 109 at the front ends of the connector casings. The length of the joint pin 15 is equal to or slightly smaller than the sum of thicknesses of these two optical fiber connector casings. The joint pin 15, which can be knocked into the through holes 109 by a tool during assembling, is preferably made of metal such as an aluminium alloy or a steel, to ensure its excellent connecting strength. It should be understood that the cross-section of the joint pin 15 is not limited to be circular, instead, the joint pin 15 may also be a connecting rod with a rectangular or a polygonal cross-section, and accordingly the cross-section of the through hole 109 is rectangle or polygonal. A plurality of (e.g. two or more) the connecting rods may also be provided to achieve a higher connecting strength, and correspondingly a plurality of the through holes 109 are provided at each of the optical fiber connectors.

In the present embodiment, the through slots 505 are arranged at the tail ends of the optical fiber connector casings, and the combined anti-spin insert 16 used as the connecting sheet is inserted into the through slots 505 and connected with the two boots 8 so that the two optical fiber connectors are connected together. The combined anti-spin insert 16 is in an interference fit with the through slots 505 and the lateral width of the combined anti-spin insert 16 is equal to or slightly smaller than the sum of thicknesses of the two optical fiber connectors. Further, for enhancing the fit between the combined anti-spin insert 16 and the through slots 505, a positioning block 506 is arranged within the through slot 505, and a notch 161 matching with the positioning block 506 is correspondingly arranged at the combined anti-spin insert 16. The positioning block 506 may be stuck in the notch 161, thus effectively preventing the releasing of the combined anti-spin insert 16 from the through slots 505. Further, retaining protrusions 162 may also be arranged at the internal face of the notch 161 of the combined anti-spin insert 16, and is used to rest against both sides of the positioning block 506, thus preventing further the releasing of the combined anti-spin insert 16 from the through slots 505 in use.

Figure 1:
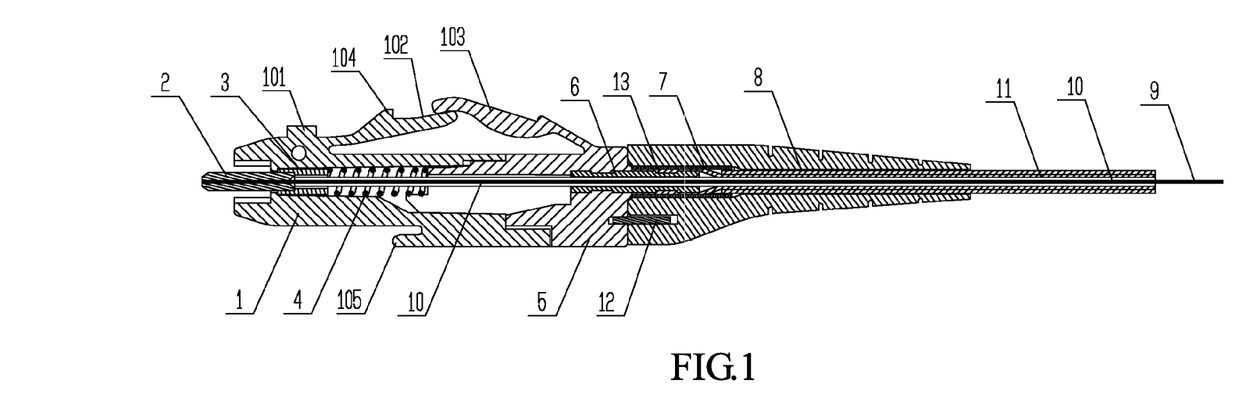
FIG. 1 is a schematic structural view showing the assembly of a single-core optical fiber connector according to an embodiment of the present invention.
Figure 2:
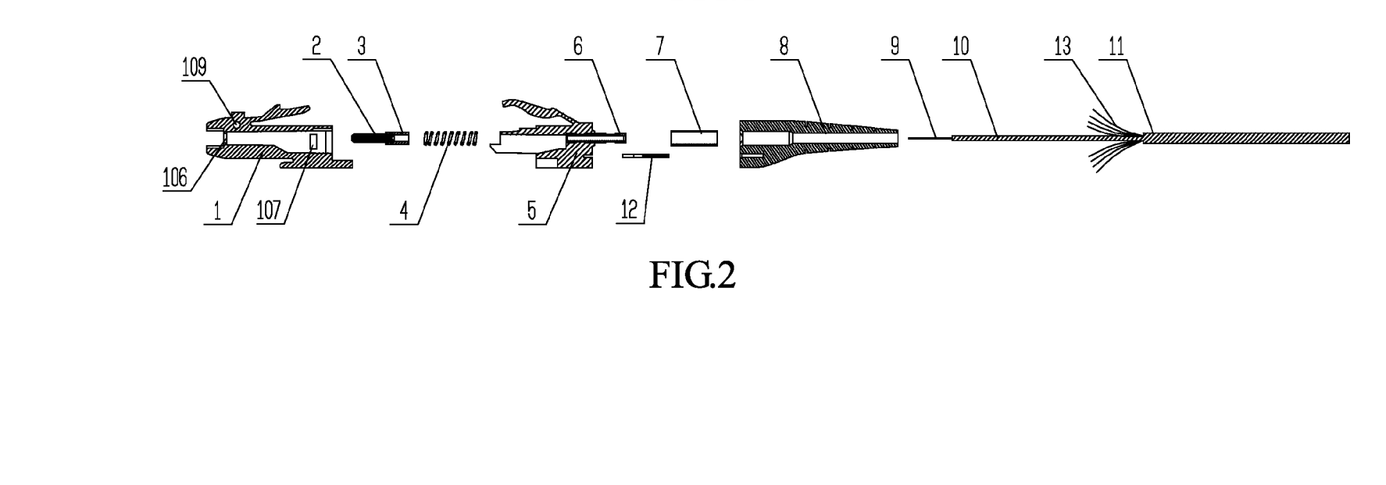
FIG. 2 is an exploded view of the connector shown in FIG. 1.
Figure 3:
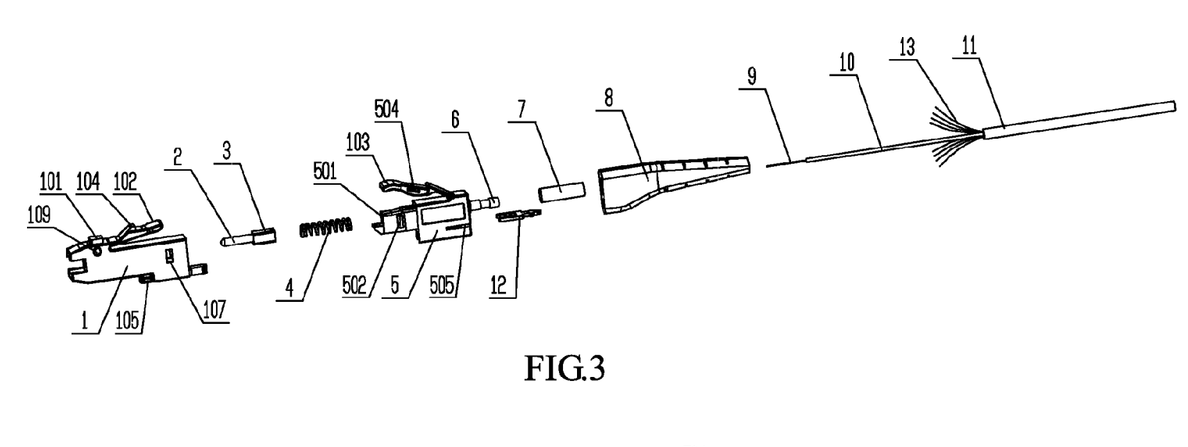
FIG. 3 is an exploded view showing the assembly of the single-core optical fiber connector according to the embodiment of the present invention.
Figure 4:
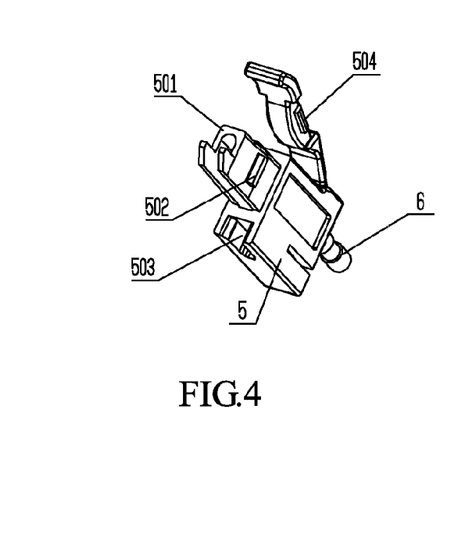
FIG. 4 is a schematic view showing the structure of a rear casing of the single-core optical fiber connector according to the embodiment of the present invention.
Figure 5:
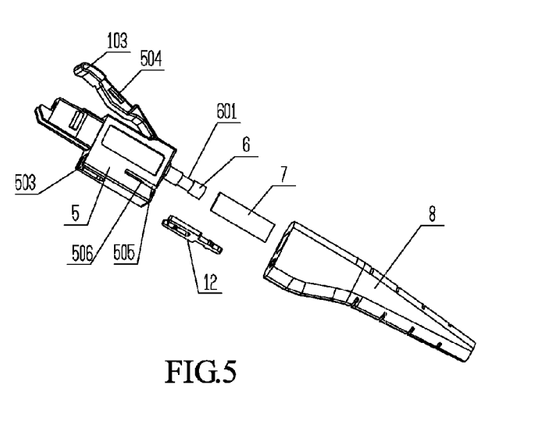
FIG. 5 is a schematic structural view showing the assembly of the rear casing and a boot of the single-core optical fiber connector according to the embodiment of the present invention.
Figure 6:
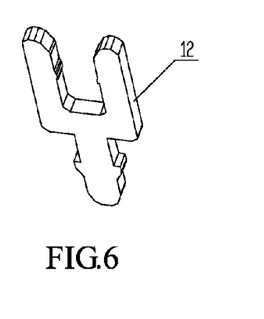
FIG. 6 is a schematic view showing the structure of an anti-spin insert according to the embodiment of the present invention.
Figure 7:
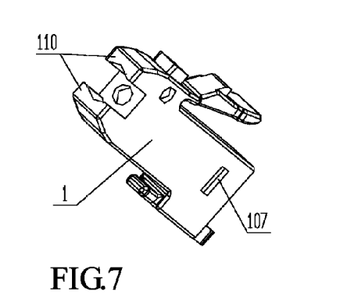
FIG. 7 is a schematic view showing the structure of a front casing of the optical fiber connector according to the embodiment of the present invention.
Figure 8:
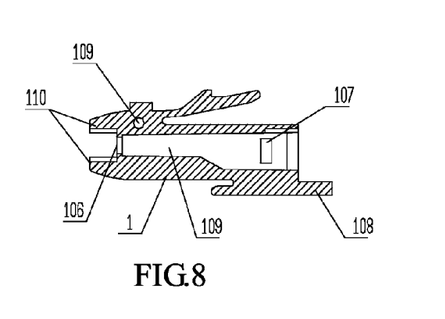
FIG. 8 is a section view showing the structure of the front casing of the optical fiber connector according to the embodiment of the present invention.
Figure 9:
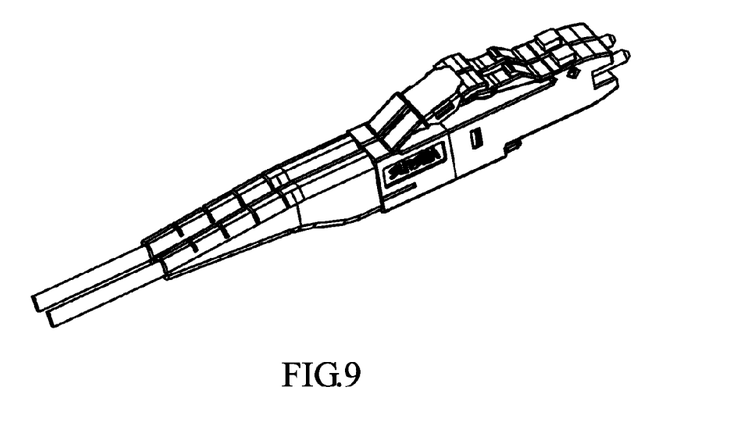
FIG. 9 is a schematic view showing the structure of a double optical fiber connector according to an embodiment of the present invention.
Figure 10:
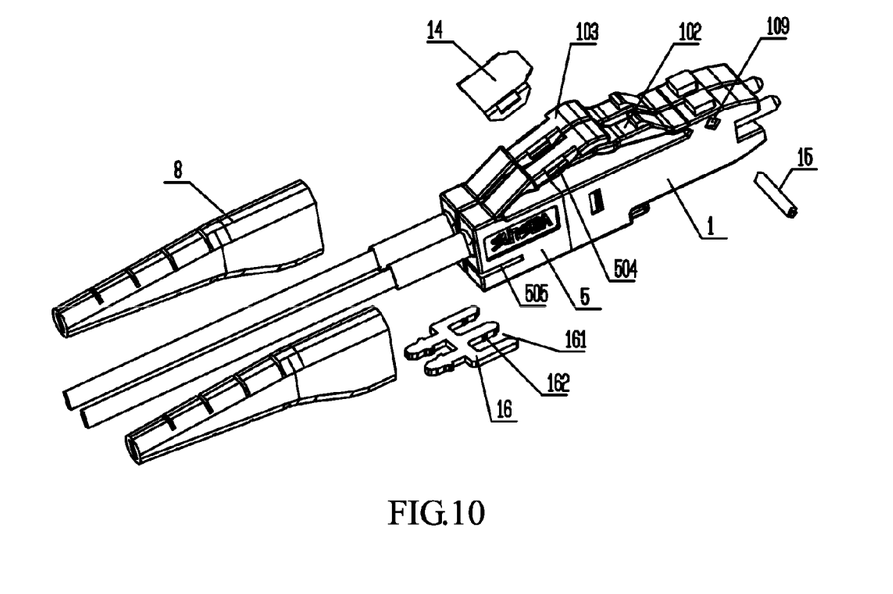
FIG. 10 an exploded view showing the assembly of the double optical fiber connector according to the embodiment of the present invention.
Figure 11:
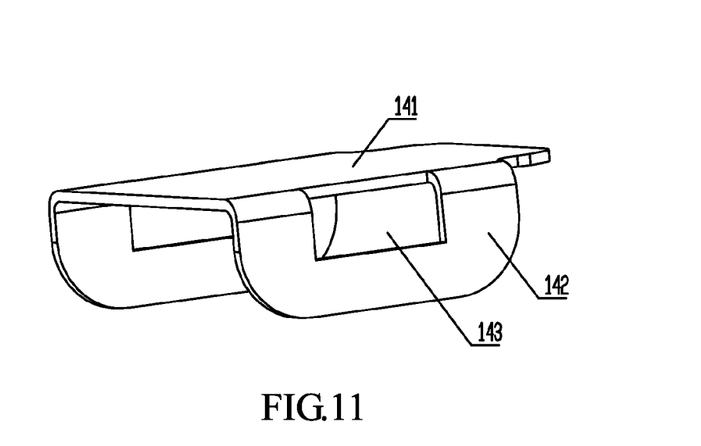
FIG. 11 is a schematic view showing the structure of a clamp according to the embodiment of the present invention.
Figure 12:
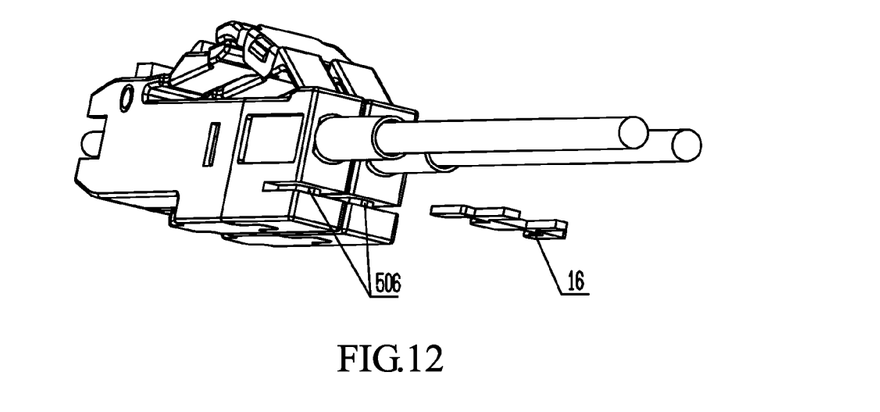
FIG. 12 is a schematic view showing the structure of a tail though slot of the optical fiber connector according to the embodiment of the present invention.
Figure 13:
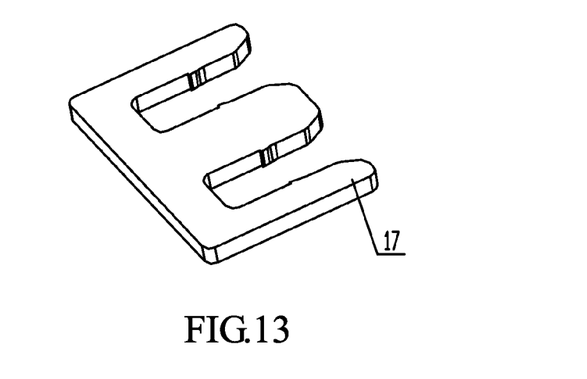
FIG. 13 is a schematic view showing the structure of a combined connecting plate according to the embodiment of the present invention.

FIG. 13 shows a combined connecting plate 17 suitable for replacing the above combined anti-spin insert 16. The combined connecting plate 17 is not intended to be connected with the boot 8, but functions to connect the connector casings as a connecting sheet.

It should be understood that the multiple combined optical fiber connector may be also formed using separately the combination of the connecting rod with the through holes or the combination of the connecting sheet with the through slots. More than two (preferably an even number of) optical fiber connectors may be combined.

The structure of the optical fiber connector according to the present invention is given as above, an assembly method of a single-core optical fiber connector corresponding to such optical fiber connector includes the following steps 1-7:

1. a tail end of a ceramic ferrule 2 is inserted into and fixed to a ceramic ferrule tailstock 3;

2. an optical fiber jacket 11 of a connecting end of an optical fiber is removed, an optical fiber tight buffer 10 of a suitable length and an aramid yarn layer 13 of a suitable length are remained, and an optical fiber core 9 of a suitable length is exposed;

3. the connecting end is inserted into the boot 8, the metal pipe 7, the tail pipe 6, the rear casing 5 and the spring 4 successively, and then the optical fiber core 9 is cleaned to remove a coating layer and inserted into the hole of the ceramic ferrule 2 through the ceramic ferrule tailstock 3;

4. an adhesive placed into the ceramic ferrule tailstock 3 beforehand is heated and solidified so that the optical fiber is fixedly connected with the ceramic ferrule tailstock 3;

5. after the adhesive is solidified, the ceramic ferrule 2 along with the ceramic ferrule tailstock 3 are placed into the front casing 1 so that the ceramic ferrule 2 projects from the through hole 106 at the front end of the front casing 1, then the spring 4 is placed within the front casing 1, and the rear casing 5 is inserted into the front casing 1 for locking;

6. the tail pipe 6 is covered by the aramid yarn layer 13, and then the metal pipe 7 is placed around the aramid yarn layer 13 and pressed and deformed to form a fixed connection; and 7. an anti-spin insert 12 is assembled in the rear casing 5, and the anti-spin insert 12 and the metal pipe 7 are inserted into the boot 8 to complete the assembly of the connector.

In the step 7, the optical fiber jacket 11 may be fixedly adhered to the boot 8 if the thickness of the connector casing is relative small.

If the connector casing has a relatively big lateral dimension and the boot 8 has a sufficient thickness, a heat-shrinkable sleeve may also be arranged around the metal pipe 7 and the optical fiber jacket 11 to enhance the fixation. Accordingly in assembling, the connecting end is inserted into the heat-shrinkable sleeve and then into the metal pipe 7 in the step 3, and then the heat-shrinkable sleeve is placed around the metal pipe 7 and the optical fiber jacket 11 and then heated and fixed after the step 6.

Correspondingly, the assembly method of the multiple-core optical fiber connector also includes the following steps 1-3:

1. a plurality of the assembled single-core optical fiber connectors are arranged closely in parallel, and a connecting rod is inserted through a through hole 109 of each connector successively;
2. a connecting sheet is inserted into a through slot 505 of each connector; and
3. a clamp 14 clamps onto clamp hook tabs 504 of the single-core optical fiber connectors at the lateral sides of the multiple-core optical fiber connector to combine integrally a plurality of second elastic cantilevers 103.

In the single-core optical fiber connector according to the present invention, the lateral width of the single-core optical fiber connector casing may be as small as 2.5 mm-4.5 mm, which is much less compared with the existing connector, thereby greatly improving the installation density of the optical fiber connectors.

The embodiments according to the present invention have been described in detail above, but these embodiments are not intended to limit the scope of the present invention. Any equivalent implements or modifications made within the technical spirit of the present invention should be included within the claimed scope of the present application.

The invention claimed is:

1. An optical fiber connector for matching with an optical fiber adapter, comprising a connector casing, a ceramic ferrule, a spring and a boot, wherein, the connector casing has a lateral width of 2.5 mm to 4.5 mm and is formed by a front casing and a rear casing locked together, a cavity is formed within the connector casing, a tail portion of the connector casing is connected to the boot, a guiding block for preventing inversed insertion and a combined elastic arm are successively arranged on the external side of the connector casing from the front end to the rear end of the connector casing, and a retaining convex block is arranged on the combined elastic arm; a tail end of the ceramic ferrule is fixed to a ceramic ferrule tailstock and the ceramic ferrule projects out from a through hole at the front end of the connector, and the spring is compressed between a stop block formed on the inner wall of the connector casing and the ceramic ferrule tailstock, wherein the cross section of an inserting portion of the rear casing has an inverted-U shape, front casing hook tabs are provided on both external lateral sides of the inserting portion, and correspondingly the front casing contains engagement recesses at its both lateral walls, so that the front casing hook tabs and the engagement recesses are locked with each other when the rear casing is inserted into the front casing.

2. The optical fiber connector of claim 1, wherein, an inserting block is arranged at the bottom of the connector casing and is adapted to be inserted into a corresponding groove at the optical fiber adapter, to prevent the shake of the optical fiber connector in a vertical direction.

3. The optical fiber connector of claim 1, wherein, the combined elastic arm includes two elastic cantilevers arranged opposite to each other, including a first elastic cantilever and a second elastic cantilever, wherein an end of the first elastic cantilever is provided with a retaining convex block with a slope, and clamp hook tabs are provided at lateral faces of the second elastic cantilever and used along with a clamp for combining integrally a plurality of the second elastic cantilevers.

4. The optical fiber connector of claim 1, wherein, a positioning block and a positioning slot matching with each other are arranged at the bottoms of the front casing and the rear casing, respectively.

5. The optical fiber connector of claim 1, wherein, the front end of the connector casing contains surrounding protectors corresponding to the projecting portion of the ceramic ferrule, and the surfaces of the surrounding protectors that face each other are arc-shaped.

6. The optical fiber connector of claim 1, wherein, the cavity has a small front portion and a large rear portion, the front portion of the cavity constrains the spring circumferentially, and the rear portion of the cavity is used to accommodate the bending deformation of the optical fiber caused by the retreatment of the ceramic ferrule.

7. The optical fiber connector of claim 1, wherein, a tail portion of the rear casing is fixedly connected with a tail pipe in communication with the cavity, and the tail pipe is provided with a circumferential groove and extended through a metal pipe which is deformable when pressed.

8. The optical fiber connector of claim 1, wherein, the boot is fixedly connected to the connector casing by the tail pipe and an anti-spin insert.

9. The optical fiber connector of claim 1, wherein, a through hole is arranged at the connector casing, and is used for receiving a connecting rod for combining integrally a plurality of the optical fiber connectors.

10. The optical fiber connector of claim 9, wherein, the connecting rod is a joint pin, which is in an interference fit with the through hole.

11. The optical fiber connector of claim 1, wherein, a through slot is arranged at the connector casing, and is used for receiving a connecting sheet for combining integrally a plurality of the optical fiber connectors.

12. The optical fiber connector of claim 11, wherein, the connecting sheet is a combined anti-spin insert, which is used for simultaneously connecting a plurality of the connector casings and the boots.

13. The optical fiber connector of claim 11, wherein, the connecting sheet is a combined connecting plate, which is used for connecting simultaneously a plurality of the connector casings.

14. An assembly method of a single-core optical fiber connector, comprising steps of:
1). inserting and fixing a tail end of a ceramic ferrule to a ceramic ferrule tailstock;
2). removing an optical fiber jacket of a connecting end of an optical fiber, remaining an optical fiber tight buffer of a suitable length and an aramid yarn layer of a suitable length, and exposing an optical fiber core of a suitable length;
3). inserting the connecting end into a boot, a metal pipe, a tail pipe, a rear casing and a spring successively, and then cleaning the optical fiber core to remove a coating layer and inserting the optical fiber core into the hole of the ceramic ferrule through the ceramic ferrule tailstock;
4). heating and solidifying an adhesive placed into the ceramic ferrule tailstock beforehand so that the optical fiber is fixedly connected with the ceramic ferrule tailstock;
5). after the adhesive is solidified, placing the ceramic ferrule along with the ceramic ferrule tailstock into a front casing so that the ceramic ferrule projects from the through hole at the front end of the front casing, then the spring is arranged within the front casing, and inserting the rear casing into the front casing for locking;

6). covering the tail pipe by the aramid yarn layer, placing the metal pipe around the aramid yarn layer, and pressing and deforming the metal pipe to form a fixed connection; and 7). assembling an anti-spin insert in the rear casing, and inserting the anti-spin insert and the metal pipe into the boot to completing the assembly of the connector, wherein a cross section of an inserting portion of the rear casing has an inverted-U shape, front casing hook tabs are provided on both external lateral sides of the inserting portion, and correspondingly the front casing contains engagement recesses at its both lateral walls, so that the front casing hook tabs and the engagement recesses are locked with each other when the rear casing is inserted into the front casing.

15. The assembly method of a single-core optical fiber connector of claim 14, wherein, the step 7 further comprises adhering fixedly the optical fiber jacket to the boot by an adhesive.

16. The assembly method of a single-core optical fiber connector of claim 14, wherein, a heat-shrinkable sleeve is further used for enhancing the strength of connecting the optical fiber, and correspondingly the connecting end is inserted into the heat-shrinkable sleeve and then into the metal pipe in the step 3, and then the heat-shrinkable sleeve is placed around the metal pipe and the optical fiber jacket and then heated and fixed after the step 6.

17. An assembly method of a multiple-core optical fiber connector, comprising steps of:

1). arranging a plurality of the assembled single-core optical fiber connectors closely in parallel, and inserting a connecting rod through a through holes of each connector successively;

2). inserting a connecting sheet into through slots of the plurality of connectors; and 3). clamping a clamp onto clamp hook tabs of the single-core optical fiber connectors at the lateral sides of the multiple-core optical fiber connector to combine integrally a plurality of second elastic cantilevers, wherein a cross section of an inserting portion of a rear casing has an inverted-U shape, front casing hook tabs are provided on both external lateral sides of the inserting portion, and correspondingly a front casing contains engagement recesses at its both lateral walls, so that the front casing hook tabs and the engagement recesses are locked with each other when the rear casing is inserted into the front casing.

* * * * *